(12) United States Patent
Parks (10) Patent No.: US 6,594,736 B1
(45) Date of Patent: Jul. 15, 2003

(54) SYSTEM AND METHOD FOR SEMAPHORE AND ATOMIC OPERATION MANAGEMENT IN A MULTIPROCESSOR

(75) Inventor: David Parks, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 414 days.

(21) Appl. No.: 09/638,365

(22) Filed: Aug. 15, 2000

(51) Int. Cl.[7] .............................................. G06F 12/00
(52) U.S. Cl. ..................... 711/151; 711/153; 711/154; 711/170; 709/217; 710/200
(58) Field of Search .................... 365/189.05; 709/217; 710/200; 711/147, 148, 151, 153, 154, 156, 163, 170, 173

(56) References Cited

U.S. PATENT DOCUMENTS

| | | | |
|---|---|---|---|
| 5,276,847 A | * 1/1994 | Kohn | ......................... 711/163 |
| 5,428,783 A | * 6/1995 | Lake | ......................... 709/106 |
| 5,522,029 A | * 5/1996 | Hatfield | ......................... 714/2 |
| 5,799,195 A | * 8/1998 | Ross | ......................... 710/266 |
| 5,860,126 A | 1/1999 | Mittal | |
| 5,922,057 A | 7/1999 | Holt | |
| 6,108,756 A | 8/2000 | Miller et al. | |
| 6,125,401 A | 9/2000 | Huras et al. | |
| 6,161,169 A | 12/2000 | Cheng | |
| 6,219,763 B1 | 4/2001 | Lentz et al. | |
| 6,263,425 B1 | * 7/2001 | Falik | ......................... 712/228 |

* cited by examiner

Primary Examiner—Matthew Kim
Assistant Examiner—Christian P. Chace
(74) Attorney, Agent, or Firm—Stuart T. Langley; William J. Kubida; Hogan & Hartson LLP (57) ABSTRACT

A method and apparatus including a plurality of data processing units. A plurality of memory banks having a shared address space are coupled to the processors by a crossbar coupling to enable reading and writing data between the processors and memory banks. A unidirectional network couples the memory banks and the processors to enable cache coherency messages to be transmitted from the memory to the processors. A plurality of semaphore registers are implemented within the shared address space of the memory banks wherein the semaphore registers are accessible by the processors through the crossbar coupling.

17 Claims, 4 Drawing Sheets

SYSTEM AND METHOD FOR SEMAPHORE AND ATOMIC OPERATION MANAGEMENT IN A MULTIPROCESSOR

BACKGROUND OF THE INVENTION

1. Field of the Invention

The present invention relates, in general, to microprocessor systems, and, more particularly, to software, systems and methods for implementing atomic operations in a multiprocessor computer system.

2. Relevant Background

Microprocessors manipulate data according to instructions specified by a computer program. The instructions and data in a conventional system are stored in memory which is coupled to the processor by a memory bus. Computer programs are increasingly compiled to take advantage of parallelism. Parallelism enables a complex program to be executed as a plurality of similar or disjoint tasks that are concurrently executed to improve performance.

Traditionally, microprocessors were designed to handle a single stream of instructions in an environment where the microprocessor had full control over the memory address space. Multiprocessor computer systems were developed to improve program execution by providing a plurality of data processors operating in parallel. Early multiprocessor systems used special-purpose processors that included features specifically designed to coordinate the activities of the plurality of processors. Moreover, software was often specifically compiled to a particular multiprocessor platform. These factors made multiprocessing expensive to obtain and maintain.

The increasing availability of low-cost high performance microprocessors makes general purpose multiprocessing computers feasible. As used herein the terms "microprocessor" and "processor" include complex instruction set computers (CISC), reduced instruction set computers (RISC) and hybrids. However, general purpose microprocessors are not typically designed specifically for large scale multiprocessing. Some microprocessors support configurations of up to four processors in a system on a shared bus. To go beyond these limits, special purpose hardware, firmware, and software must be employed to coordinate the activities of the various microprocessors in a system.

Inter process communication and synchronization are two of the more difficult coordination problems faced by multiprocessor system designers. Essentially, the problems surround coordinating the activities of each processor by exchanging state information between related processes running on different, and quite often autonomous, processors. Inability to coordinate processor activities is a primary limitation in the scaleability of multiprocessor designs. Solutions to this problem becomes quite complex as the number of processors increases.

State information is often embodied in a data structure called a "semaphore" and can be stored in a shared memory resource or semaphore register. A semaphore is essentially a flag or set of flags comprising values that indicate the status of a common (i.e., shared) resource. For example, a set of semaphores may be used to assert a lock over a particular shared resource. It is desirable to make semaphores available to all processors in a multiprocessor system.

Semaphores are accessed by, modified by, and communicated with various processes on an ongoing basis. Semaphore manipulation typically involves a small set of relatively simple operations such as test, set, test and set, write, clear, and fetch. These operations are sometimes performed in combination with some primary mathmatical or logical operation (e.g., increment, decrement, AND, OR). When semaphores are memory resident, access to the semaphores is accomplished in a manner akin to memory operations (e.g., read/write or load/store operations) in that the semaphore data is read, updated, and written back to the semaphore register structure. This process is often referred to as a "read-modify-write" cycle.

These semaphore management operations typically involve transferring the semaphore to a processor's cache/internal register, updating the semaphore value, and transferring the updated semaphore back to the semaphore register structure. The semaphore manipulations must be atomic operations in that no processor can be allowed to manipulate (i.e., change) the semaphore value while a semaphore management operation is pending or in flight (e.g., when the semaphore is being manipulated by another processor). Accordingly, memory-mapped semaphore manipulations imply a bus lock or other locking mechanism during a typical read-modify-write cycle to ensure atomicity. Bus locking, however, may not be possible unless all processors share a common bus, and significantly impacts performance and scalability of the multiprocessor design. Moreover, some mechanisms for ensuring atomic operations rely on special instructions in the microprocessor instruction set architecture (ISA). Such a requirement greatly limits the flexibility in processor selection. A need exists for a method and system for manipulating memory-mapped semaphore registers that does not suffer the locking penalties associated with conventional atomic memory operations.

Atomicity can be ensured by making the semaphore cacheable and using cache coherency mechanisms such as the MESI protocol to enforce atomicity. Alternatively the semaphore can be made uncacheable so that it exists only in the shared memory space and processor bus lock mechanisms used prevent all processor communication until the semaphore management operation completes. In either case, when a semaphore is being concurrently shared by a large processor count there are performance and implementation issues.

Using a cached semaphores requires one processor to modify the semaphore and then propagate the modification to all other caches having copies of the semaphore. To migrate a cache line with write access from one processor to another quite often involves multiple memory read transactions along with one or more cache coherency operations and their accompanying replies. The latency of acquiring exclusive access to a cache line is a function of the number of processors that currently share access to the line. Because of this, using cache coherency mechanisms such as the MESI protocol do not scale well. Given that it is desirable to configure memory as cacheable (specifically, using a write allocate cache policy), and that the cache coherency protocol is designed to support upwards of 40 processors, inevitably there will be parallel applications where large processor counts will be using shared memory locations to synchronize program flow.

Host bus locking ensures atomicity in a very brute force manner. The atomic operation support in the IA32 instruction set with uncached memory requires two bus operations: a read, followed by a write. While these operations proceed a bus lock is asserted which prevents other processors from gaining access to and utilizing the unused bus bandwidth. This is particularly detrimental in computer systems where multiple processors and other components share the host bus potentially creating conditions for system deadlock. Asserting bus lock by any agent using the host bus will prevent the other processors from being able to start or complete any bus transaction targeting memory.

Similar issues exist for any atomic memory operation. An atomic memory operation is one in which a read or write operation is made to a shared memory location. Even when the shared memory location is uncached, the atomic memory operation must be completed in a manner that ensures that any processors that are accessing the shared memory location are prevented from reading the location until the atomic operation is completed.

More complex multiprocessor architectures combine multiple processor boards where each processor board contains multiple processors coupled together with a shared front side bus. In such systems, the multiple boards are interconnected with each other and with memory using an interconnect network that is independent of the front side bus. In essence, each of the multiprocessing boards has an independent front side bus. Because the front side bus is not shared by all of the system processors, coherency mechanisms such as bus locking and bus snooping, which operate only on the front side bus, are difficult if not impossible to implement.

Hence, semaphore management operations consume bus bandwidth that is merely overhead. Accordingly, it is desirable to provide a semaphore management mechanism and method that operates efficiently to minimize overhead. More specifically, a means for providing semaphore management that does not rely on either cache coherency mechanisms or bus locking mechanisms is needed.

SUMMARY OF THE INVENTION

Briefly stated, the present invention involves a method and apparatus for implementing semaphores in a multiprocessor including a plurality of data processing units. A plurality of memory banks having a shared address space are coupled to the processors to enable reading and writing data between the processors and memory banks. A plurality of semaphore registers are implemented within the shared address space of the memory banks wherein the semaphore registers are accessible by the processors using memory operations directed at the portion of the shared address space allocated to the semaphore registers.

In another aspect the present invention involves a method of operating a multiprocessor computing system in which a plurality of processors generating memory requests. A plurality of memory banks are provided that have a shared address space and responsive to memory requests to read and write data. A crossbar network couples the plurality of processors with the plurality of memory banks. A portion of the shared address space in each memory bank is dedicated to semaphore registers. The dedicated portion of memory is designated as uncacheable. A plurality of processes are executed on one or more of the plurality of processors. At runtime, a portion of the shared address space is allocated to the plurality of processes. Preferably, at least one of the physical semaphore registers in a particular memory bank is mapped into the common address space allocated to the plurality of processes in the particular memory bank.

DETAILED DESCRIPTION OF THE PREFERRED EMBODIMENTS

In general the present invention involves the allocation of a small, fixed range of shared memory as "semaphore registers". Semaphore registers are data structures that hold state information such as flags, counters and the like. Semaphore manipulation typically involves very "simple" operations, that include: test, write, set, clear, test and set, and, fetch with some primary operation (i.e. increment, decrement, AND, OR, and the like). Semaphores are often used to share information and/or resources amongst a plurality of software processes. Semaphore registers represent a type of uncached memory structure.

An important feature of the present invention is to provide a scheme by which atomic operations can be performed on memory mapped registers using conventional "read" and "write" memory references that are supported by virtually all microprocessors. However, the present invention alleviates the need for a read/modify/write cycle in manipulating semaphores.

In accordance with the present invention, the semaphore registers reside on the memory banks and are allocated a portion of the shared address space so all processors in the multiprocessor system have access to them with substantially uniform latency. Also, because shared memory is used, existing processor-to-memory communication networks can be used without need for a special-purpose network dedicated to managing semaphore traffic. Also, semaphore manipulations are accomplished by fundamental memory operations such as read and write operations such that virtually any microprocessor and instruction set architecture can be used.

The present invention is illustrated and described in terms of a general-purpose multiprocessing computing system comprising a number of substantially identical microprocessors having integrated cache memory. Although this type of computing system is a good tool for illustrating the features and principles of the present invention, it should be understood that a heterogeneous set of processors may be used. Some processors may include integrated cache, some processors may include external cache, and yet other processors may have no cache at all. The invention is illustrated in terms of a shared memory system, but certain aspects will have application in partitioned memory systems as well. Accordingly, the specific examples given herein are supplied for purposes of illustration and understanding and are not to be viewed as limitations of the invention except where expressly stated. Moreover, an important feature of the present invention is that it is readily scaled upwardly and downwardly to meet the needs of a particular application. Accordingly, unless specified to the contrary the present invention is applicable to significantly larger, more complex network environments as well as small network environments such as conventional local area network (LAN) systems.

Figure 1:
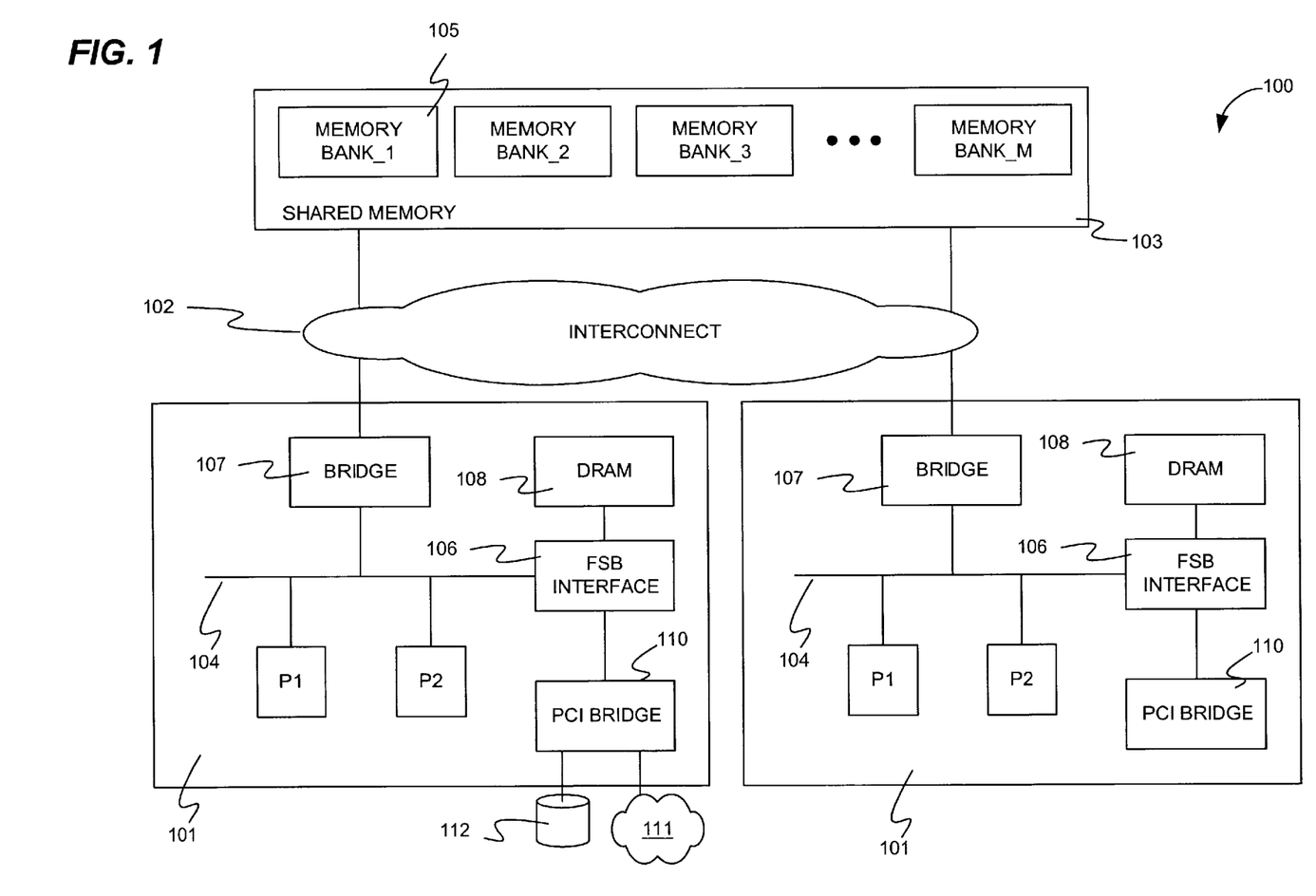
FIG. 1 shows a multiprocessor computer environment in which the present invention is implemented.

FIG. 1 shows a multiprocessor computer environment in which the present invention is implemented. Multiprocessor computer system 100 incorporates N processor boards 101. Each processor board 101 is logically referred to as a processor node 101. Each processor board 101 comprises one or more microprocessors, such as processors P1 and P2, having integrated cache memory in the particular examples. Processor boards 101 may be configured in groups sharing a common front side bus (FSB) 104 and sharing a common gateway through a bridge 107 to host bus network 102. An exemplary processor is the Pentium® III Xeon™ processor manufactured by Intel Corporation which can be configured as single processors and symmetric multiprocessors (SMP) of up to four processors. Clustered designs of multiple SMP systems are also available.

Processors 101 are bidirectionally coupled to shared memory 103 through interconnect network 102. Interconnect network 102 preferably implements a full crossbar connection enabling any processor board 101 to access any memory location implemented in any memory bank 105. Shared memory 103 is configured as a plurality M of memory banks 105. Each memory bank 105 may itself comprise a group of memory components. Preferably shared memory 103 is organized as a plurality of "lines" where each line is sized based on the architecturally defined line size of cache within processors 101. A line in memory or cache is the smallest accessible unit of data although the present invention supports memory architectures that permit addressing within a line.

Each processor board 101 may include a front side bus (FSB) gateway interface 106 that enables access to local memory 108 and peripheral component interconnect (PCI) bridge 110. In the particular examples local memory 108 is not included in the address space of shared memory 103 and is shared only amongst processors P1 and P2 coupled to the same front side bus 104 as the FSB crossbar 106. PCI bridge 110 supports conventional PCI devices to access and manage, for example, connections to external network 111 and/or storage 112. It is contemplated that some processor boards 101 may eliminate the PCI bridge functionality where PCI devices are available through other boards 101.

Significantly, the front side bus 104 of each processor board 101 is independent of the front side bus 104 of all other processor boards 101. Hence, any mechanisms provided by, for example, the IA32 instruction set to perform atomic operations will not work as between processors located on different boards 101.

Memory operations are conducted when a processor P1 or P2 executes an instruction that requires a load from or store to a target location in memory 103. In executing a memory operation, the processor first determines whether the target memory location is represented, valid and accessible in a cache. The cache may be onboard the processor executing the memory operation or may be in an external cache memory. In case of a cache miss, the memory operation is handled by bridge 107. Bridge 107 generates a access request to host bus network 102 specifying the target location address, operation type (e.g., read/write), as well as other control information that may be required in a particular implementation. Shared memory 103 receives the request and accesses the specified memory location. In the case of a read operation the requested data is returned via a response passed through host bus network 102 and addressed to the bridge 107 that generated the access request. A write transaction may return an acknowledgement that the write occurred. In the event an error occurs within shared memory 103 the response to bridge 107 may include a condition code indicating information about the error.

Figure 2:
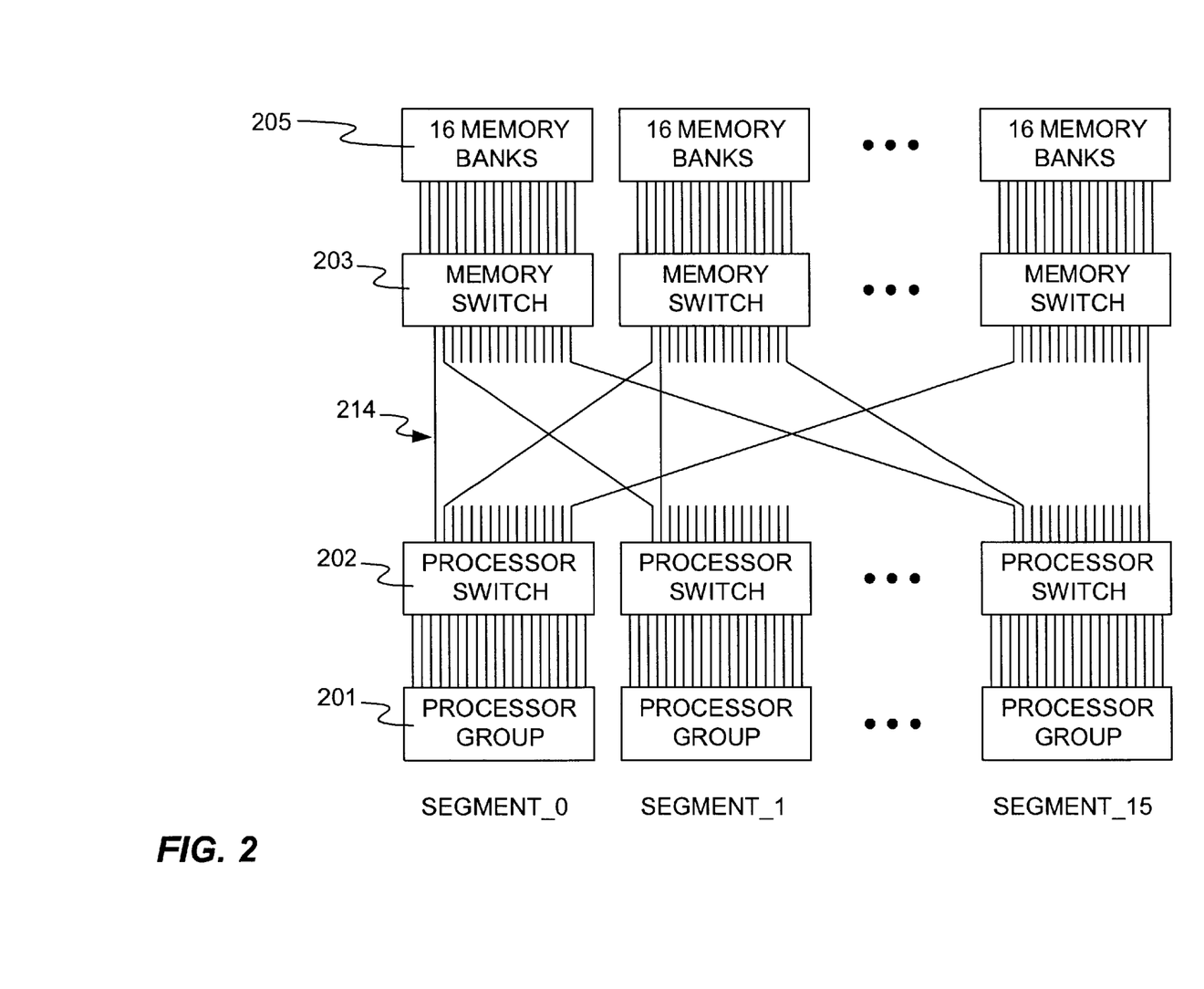
FIG. 2 shows portions of an exemplary multiprocessor in accordance with the present invention.

FIG. 2 illustrates a specific implementation and interconnect strategy supporting implementations of the present invention. In the implementation of FIG. 2 there are sixteen segments labeled SEGMENT_0 through SEGMENT_15. Each segment includes a processor group 201. A processor group 201 in a particular example includes thirty two processors, each coupled to processor switch 202 through a bi-directional data and command interface. Processor switch 202 includes an output to a trunk line 214 for each memory bank group 205. Similarly, each memory switch 203 includes an output to the trunk line 214 for each processor group 201. In this manner, any processor group can be selectively coupled to any memory bank group through appropriate configuration of processor switch 202 and memory switch 203.

Figure 3:
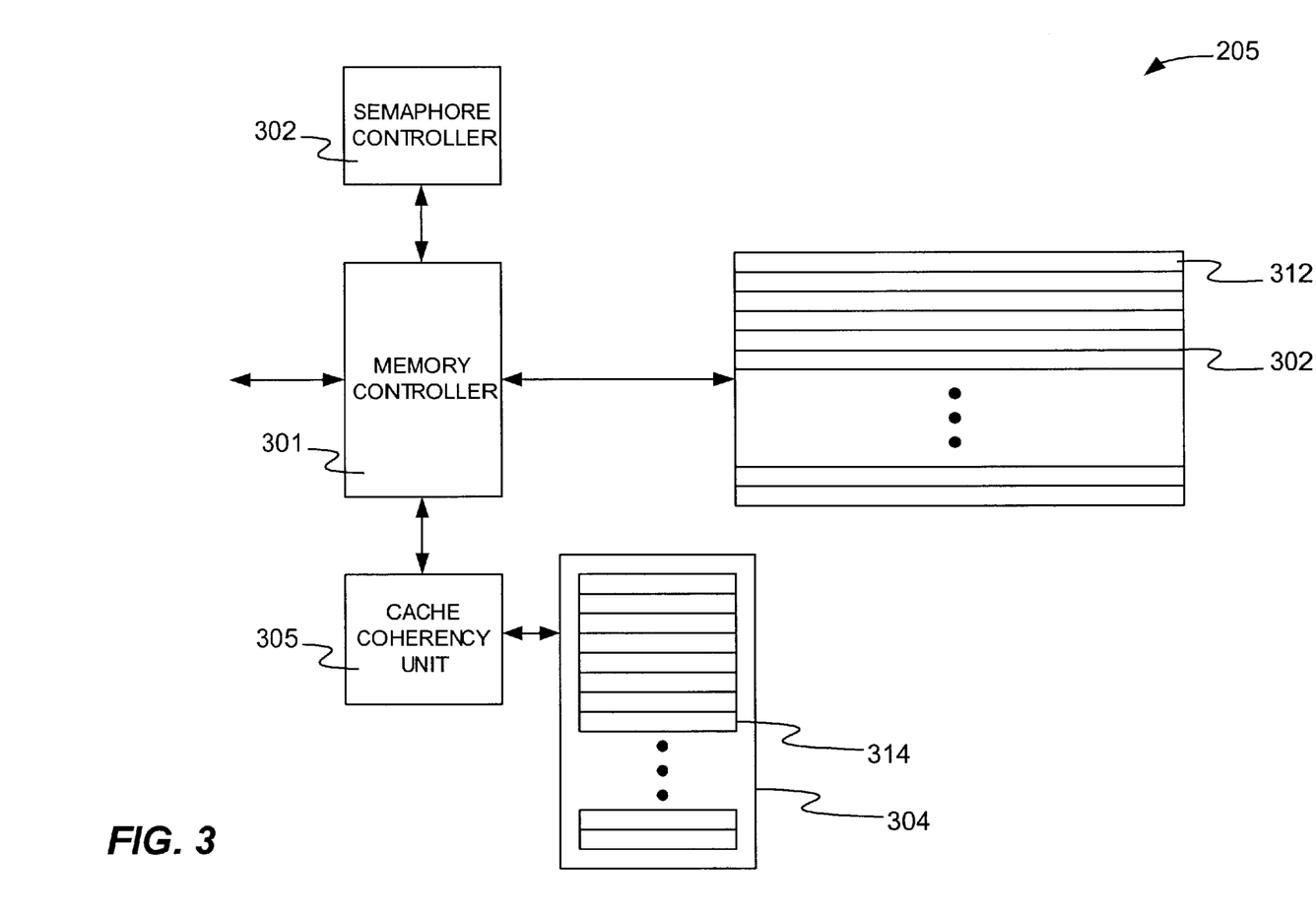
FIG. 3 illustrates cache coherency mechanisms associated with a memory bank in accordance with the present invention.

FIG. 3 shows important semaphore management mechanisms associated with a memory bank 205 in accordance with the present invention. Memory switches 203 communicate with trunk lines 214 (shown in FIG. 2) to send and receive memory access requests to memory controller 301. Upon receiving a memory access request, memory switch 203 passes information including the target memory address and processor node identification, as well as control and mode information to memory controller 301. The target memory address refers to a location in memory bank data portion 302 or a portion of the memory address space that has been allocated to semaphore controller 302.

The processor ID is a value indicating a unique processor node 101 in a multiprocessor system that is conducting the memory operation. In a particular embodiment this information is passed between switch 203 and memory controller 301 within memory bank 301 as a data packet having defined fields for the various types of information. The specific layout of this data packet is chosen to meet the needs of a particular implementation.

Most of the shared address space is allocated for data and instructions in memory 302. Memory 302 is organized as a plurality of memory lines 312, also called cache lines. In a particular example each memory line 312 is 256 bits wide and memory 302 includes a variable number of lines depending on the amount of physical memory implemented. Memory 302 is allocated to executing processes using available memory management and allocation mechanisms in a substantially conventional manner. Typically, a group of executing processes will share a common address space that is allocated to those processes at runtime. Typically all or a significant portion of the conventional memory area 302 is designated as cacheable memory.

Cache coherency unit 305 operates in conjunction with cache directory 304 to manage cache coherency across the multiple processors that may have cached copies of cacheable memory locations. Each entry 314 corresponds to a memory line within memory 302. Cache coherency chip 301 may be implemented as a custom integrated circuit such as an ASIC, a one time or re-programmable logic device such as a programmable gate array, or as discrete components coupled in a conventional circuit board or multi-chip module. Cache coherency chip 301 uses the memory address to access cache coherency directory 304. Cache coherency directory 304 includes a multi-bit entry 314 for each memory line in the shared memory address space of the particular memory bank data portion 320. Cache directory 314 includes a plurality of entries 314, each 36 bits wide in a particular example. Each entry 314 contains a value indicating the current state of the corresponding memory line.

In accordance with the present invention, a portion of the shared address space of each memory bank is allocated to hardware semaphores, hereinafter referred to as the "hardware semaphore portion". References to the hardware semaphore portion are sent to semaphore controller 302 rather than conventional memory portion 302. The hardware semaphore portion of the address space is designated as uncacheable. In a particular example, the size of hardware semaphore portion is selected to allocate a fixed address space of about 4K byte to each physical processor in the system. Hence, a system with 321 processors will allocate a total of 1.25 MB, spread amongst the memory banks 205, to hardware semaphore controller 303. In an exemplary system the total address space available is in the order of 64 GB or more. Hence, the portion allocated to hardware semaphores is relatively small.

Normal memory read/write operations address locations within conventional memory portion 302 as the executing processes cannot be assigned address space within the hardware semaphore portion by the virtual memory management system. The present invention introduces a new system call into the operating system code to map one or more of the physical semaphore registers within semaphore controller 302 into the process' common address space. This enables the processes to read and write data with the hardware semaphore registers by conventional memory operations.

For any multiprocessor system having a number "n" physical processors, there may be "n" processes executing in addition to an OS process executing at any given time. Each process should have its own semaphore register, hence the system should support n+1 semaphore registers.

Atomicity of semaphore operations is important to ensure that any operation that manipulates a semaphore value is completed before another operation that reads or manipulates the semaphore can take place. In the preferred implementation, serialization of memory operations is under the control of bridge controller 107 shown in FIG. 1. Bridge controller 107 includes mechanisms referred to as "fence operations" that impose order on memory operations that affect uncached address space. A programmer uses the fence operations to ensure correctness. These mechanisms ensure that uncached memory references are completed before allowing any cached read/write or uncached read operations to proceed. Uncached memory references are memory operations that specify an uncached area of the address space, including to the hardware semaphore portion of the address space. These mechanisms operate in a similar manner in conjunction with the present invention to ensure that semaphore manipulations, which appear to bridge controller 107 as uncached memory operations, are serialized. This implicitly guarantees that all references to the uncached hardware semaphore area 303 will be serialized. This functionality is akin to the prior methods of stalling the memory bus during a semaphore write operation. However, the negative impacts are significantly curtailed by stalling these memory transactions in the manner described herein. It is contemplated that semaphore modification operations will take no more than six clock cycles to complete as compared to the upwards of hundreds of clock cycles previous bus stalling techniques incurred.

Figures 4, 5:
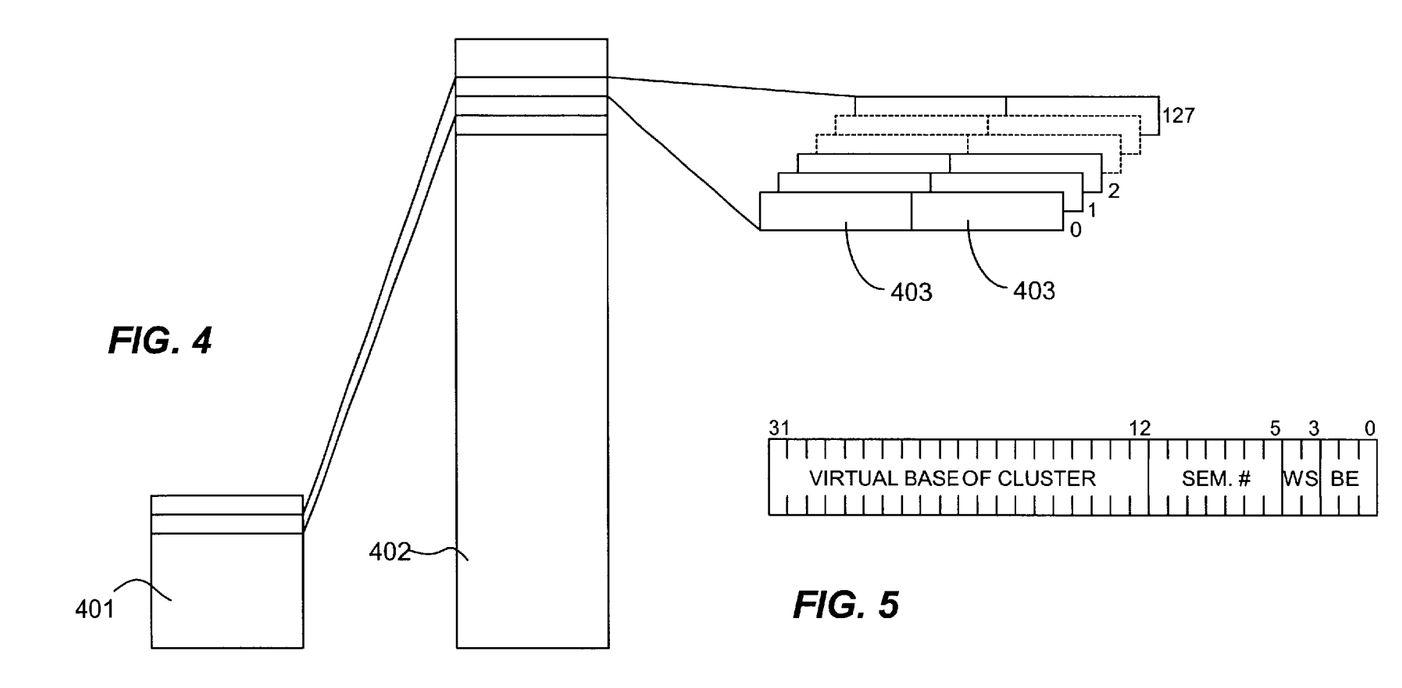
FIG. 4 shows a memory mapping diagram illustrating operation of a semaphore mechanism in accordance with the present invention.
FIG. 5 and FIG. 6 illustrate an exemplary addressing format used to read and write the contents of semaphores 303.

FIG. 4 shows a conceptual diagram illustrating an exemplary layout of the semaphore registers within the context of the entire memory address space. The linear address space 401 represents the common block of address spaced assigned to a given set of independent or common executing processes. Physical address space 402 represents the available physical memory in which the memory portions 302 and 303 (shown in FIG. 3) are physically implemented. As shown in FIG. 4, a number of physical memory lines are allocated to hardware semaphore registers 303. In the particular example, each memory line is 64 bits wide so that in normal operation memory reads and writes are performed in 8-byte wide groups of data.

The hardware semaphore memory area 303 holds a cluster of hardware semaphore registers. The cluster of registers is preferably mapped to a common linear address space shared by a plurality of processes. It should be noted that the memory management system and/or microprocessor architecture impose some practical limit on the size and organization of semaphore registers. In the particular examples, semaphore "clusters" are allocated on 4 KB boundaries because the virtual memory (VM) management of the processor provides for multiprocessing protection mechanisms down to that granularity. Managing the semaphore register allocation involves allocating or assigning a particular hardware semaphore register within controller 304 to a particular process by the VM system so as to avoid assignment of a single register to unrelated processes. Management at a cluster level provides efficiency over, for example, allocating individual or small groups of hardware semaphore registers on a register-by-register basis.

As illustrated in the exploded portion of FIG. 4 each memory line holds either one (1) 64 bit or two (2) 32-bit semaphore registers two semaphore registers 403. In the particular examples, each semaphore register 403 in the exemplary implementation is 32-bits wide. The meaning and use of each bit within a semaphore is at the discretion of the application itself.

Figure 6:
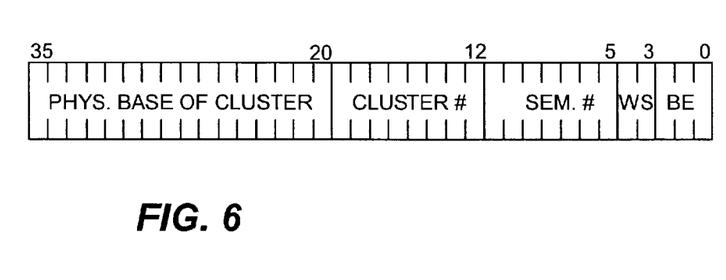

FIG. 5 and FIG. 6 illustrate an exemplary addressing format used to read and write the contents of semaphores 303. These examples assume a 32-bit virtual address (shown in FIG. 5) and a 36-bit physical address (shown in FIG. 6) In both cases, bits [0:2] are byte offset bits provided to determine whether the memory is being referenced as a 64 or 32 bit operation, bits [3:4] are operation code specifiers for the register and bits [5:11] indicate a particular semaphore within a cluster. The remaining bits [12:31] of the virtual address indicate the virtual base of the semaphore cluster of interest. In the physical address format shown in FIG. 6, bits [12:19] indicate the cluster number to identify a particular cluster within the plurality of clusters shown in FIG. 4. The physical base of the semaphores is indicated by bits [20:35] as shown in FIG. 6.

To access .any specific 32-bit hardware semaphore within a cluster the address is calculated by combining the virtual cluster base address with the semaphore number and the read/write operation code. The operation code is encoded into the word select (WS) bits as indicated in Table 1.

TABLE 1

| | WS | | | |
|---|---|---|---|---|
| MemOP | 00b | 01b | 10b | 11b |
| Write | Shr write | clear | And | Or |
| Read | Test | test&set | Fetch & increment | fetch & decrement |

The following briefly summarizes the read operations described in Table 1:

Test/ShrRead (WS=00b)

Read and return contents of requested semaphore register.

opdef: SHR_TEST32[ShrReg]

SHR_TEST64[ShrReg]

Synonym: SHR_READ32[ShrReg]
SHR_READ64[ShrReg]
Test&Set (WS=01b)
Read and return bit ($2°$) of requested semaphore register. Set semaphore register bit $2°$ to a nonzero value (i.e.,=1).
    opdef: SHR_TSET32[ShrReg]
        SHR TSET64[ShrReg]
Fetch&Increment (WS=10b)
Read and return contents of requested semaphore register.
    opdef: SHR_INC32[ShrReg]
        SHR_INC64[ShrReg]
32 or 64-bit signed increment of requested semaphore register after read.
Fetch&Decrement (WS=11b)
Read and return contents of requested semaphore register.
    opdef: SHR_DEC32[ShrReg]
        SHR_DEC64[ShrReg]
32 or 64-bit signed decrement of requested semaphore register after read.

The following briefly describes the write operations shown in Table. 1:
ShrWrite (WS=00b)
Store 32- or 64-bit data from write packet into requested semaphore register.
    opdef: SHR_WRITE32[ShrReg]
        SHR_WRITE64[ShrReg]
NOTE: Setting a semaphore register is accomplished by writing any data value (register/immediate) with bit $2°=1$.
Clear (WS=01b)
Zero contents of requested 32- or 64-bit semaphore register.
    opdef SHR_CLR32[ShrReg]
        SHR_CLR64[ShrReg]
AND (WS=10b)
AND 32- or 64-bit data from write packet with requested semaphore register.
    Semaphore-register=Semaphore_register AND Write-Packet-data.
OR (WS=11b)
OR 32- or 64-bit data from write packet with requested semaphore register.
    Semaphore_register=Semaphore-register OR Write-Packet-data.

Table 2 sets out examples of memory references and corresponding semaphore operation using the Intel Architecture 32; (IA32) instruction set. In FIG. 2 "%edi" points to base of current assigned cluster, which is a 4KB semaphore region:

TABLE 2

| Processor Operation (i.e. memory reference) | Operation |
| --- | --- |
| movl 0 (%edi), %eax | SHR_TEST32 [0] (ShrRead) |
| movl 8 (%edi), %eax | SHR_TSET32FOI 32 bit & set = 1 |
| movl 16 (%edi), %eax | SHR_INC32 [0] fetch and increment |
| movl 24 (%edi), %eax | SHR_DEC32 [0] fetch and decrement |
| movl %eax, 0 (%edi) | Write contents of %eax (ShrWrite) |
| movl %eax, 8 (%edi) | SHR_CLR32 [0], clear (%eax ignored) |
| movl $0X55555555, 16 (%edi) | Clear all odd bits in semaphore register 0 |
| movl $0XAAAAAAAA, 24 (%edi) | Set all odd bits in semaphore register 0 |

Atomic operations can be completed in one memory reference without ever asserting a bus lock. Hence, the hardware semaphore implementation in accordance with the present invention has approximately half the memory traffic of conventional uncached atomic operations and potentially greater reductions in memory/coherency traffic for cached semaphores. Any semaphore reference is completed without ever asserting a memory bus lock, thus allowing other bus agents access to memory resources. This implementation alleviates the need for a third network. Moreover, the present invention uses existing memory management capabilities to map multiple processors to one memory space (multiple physical processors accessing a common cluster). Any atomic operation to a specific semaphore register from one or more concurrently referencing processor is completed in one memory reference. No hardware deadlock conditions are likely which eliminates the need for costly and complex logic to detect a deadlock situation between two or more processors.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:
1. A multiprocessor data processing system comprising:
    a plurality of microprocessors;
    a plurality of memory banks having a shared address space;
    a network coupling the memory banks and the microprocessors to enable memory operation messages to be communicated between the memory and the microprocessors;
    a first portion of the shared address space allocated to conventional memory operations;
    a plurality of semaphore registers implemented within a second portion of the shared address space of the memory banks, wherein the semaphore register are accessible by the microprocessors through the network; and
    a bridge controller coupled to the memory banks and operable to prevent any cached read/write or uncached read operation to proceed until all semaphore write operations have completed.
2. The system of claim 1 wherein the semaphore registers are implemented in a fixed range of the memory address space allocated to each of the memory banks.
3. The system of claim 1 wherein the semaphore registers are assigned at runtime to specific software processes.
4. The system of claim 1 wherein the portion of the shared address space in which the semaphore registers are implemented is uncacheable.
5. The system of claim 1 wherein the semaphore registers support atomic operations including test, set, test&set, clear, signed increment, signed decrement, and shared read/write.
6. The system of claim 5 wherein the atomic operations are encoded into an address specifying the semaphore using a read or write memory operation natively supported by the microprocessors.
7. A method of communicating state information in a multiprocessor computing system comprising:
    providing a plurality of microprocessors generating memory requests, each memory request specifying an address within a shared space;
    allocating a portion of the shared address space in each memory bank to semaphore registers; and accessing the state information by any of the plurality of microprocessors using memory operations specifying a target address within the portion of the shared address space allocated to the semaphore registers;

specifying a virtual base portion in the memory request containing a value indicating a base address in which a cluster of semaphore registers resides;

specifying a semaphore identification portion in the memory request containing a value indicating a particular semaphore register within the cluster of semaphore registers; and specifying a value indicating a particular operation to be performed on the semaphore specified by the virtual base portion and the semaphore identification portion.

8. The method of claim 7 further comprising a step of designating the portion of the shared address space allocated to semaphore registers as uncacheable.

9. The method of claim 7 further comprising:

executing a plurality of software processes on one or more of the plurality of microprocessors;

at runtime, allocating a portion of the shared address space to the plurality of processes; and mapping at least one of the physical semaphore register sets into the common address space allocated to the plurality of processes.

10. The method of claim 7 wherein the step of accessing the state information comprises reading and returning contents of the specified semaphore register.

11. The method of claim 7 wherein the step of accessing the state information comprises reading and returning a specified bit within the specified semaphore register followed by setting the specified bit to a nonzero value.

12. The method of claim 7 wherein the step of accessing the state information comprises reading and returning contents of requested semaphore register followed by incrementing the requested semaphore register.

13. The method of claim 7 wherein the step of accessing the state information comprises reading and returning contents of requested semaphore register followed by decrementing the value of the specified semaphore register.

14. The method of claim 7 wherein the step of accessing the state information comprises storing data specified in the memory request into requested semaphore register.

15. The method of claim 7 wherein the step of accessing the state information comprises setting the contents of the semaphore register to zero.

16. The method of claim 7 wherein the step of accessing the state information comprises performing a logical AND operation between data specified in the request and a value stored in the specified semaphore register.

17. The method of claim 7 wherein the step of accessing the state information comprises performing a logical OR operation between data specified in the request and a value stored in the specified semaphore register.

* * * * *

UNITED STATES PATENT AND TRADEMARK OFFICE
CERTIFICATE OF CORRECTION

PATENT NO. : 6,594,736 B1  Page 1 of 1
DATED : July 15, 2003
INVENTOR(S) : David Parks It is certified that error appears in the above-identified patent and that said Letters Patent is hereby corrected as shown below:

<u>Column 10,</u>
Line 64, insert -- address -- after "shared"

Signed and Sealed this

Sixteenth Day of December, 2003

JAMES E. ROGAN
*Director of the United States Patent and Trademark Office*